`United States Patent Office`  3,246,763
Patented Apr. 19, 1966

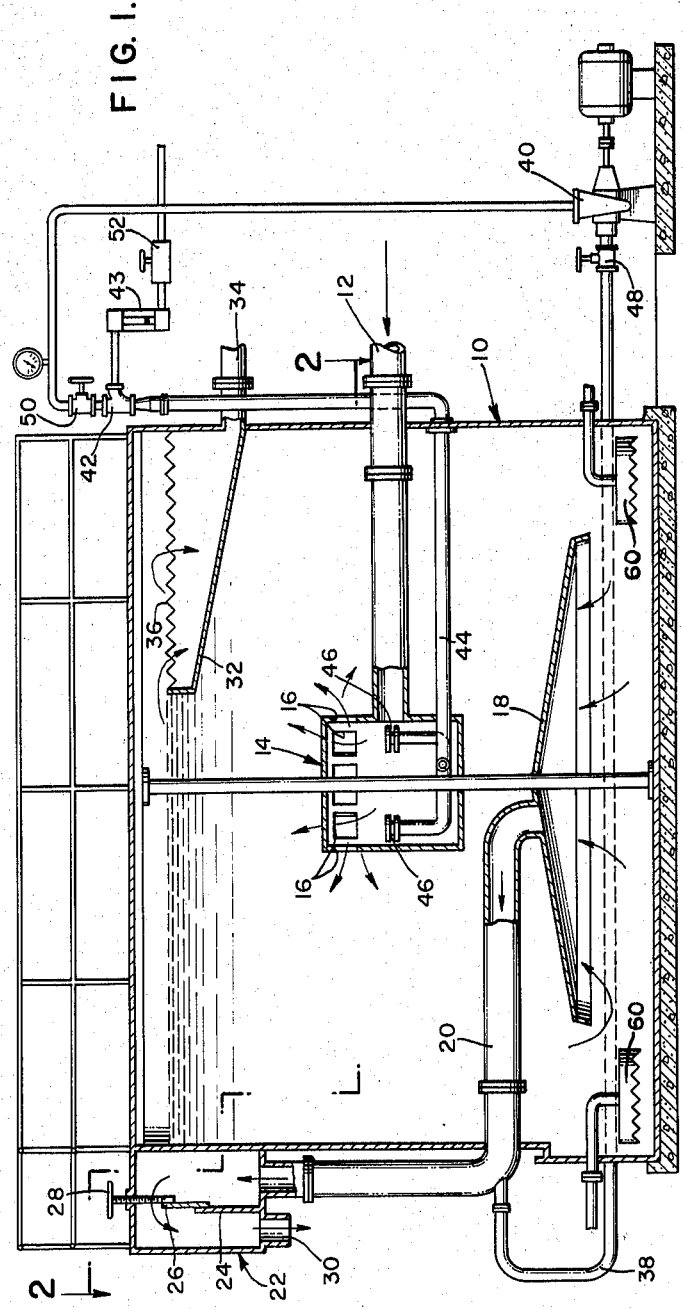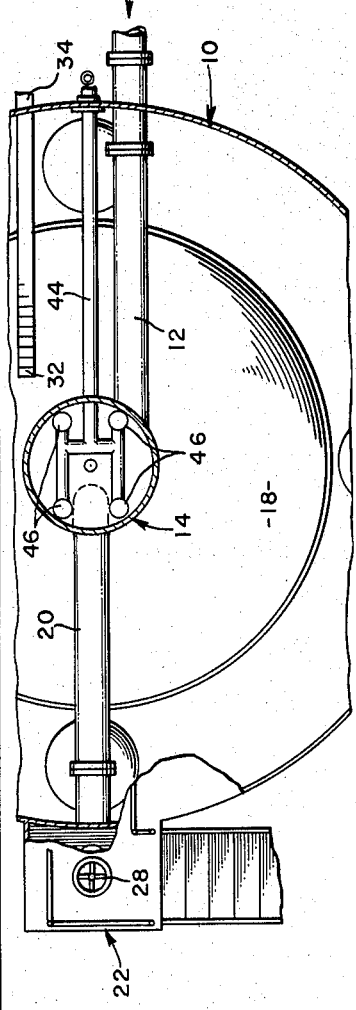

3,246,763
FLOTATION SEPARATOR
Robert A. Baum, Pasadena, Calif., assignor to Permanent Filter Corporation, Compton, Calif., a corporation of California
Filed Oct. 23, 1961, Ser. No. 146,835
1 Claim. (Cl. 210—221)

This invention relates to an improved flotation separator.

It is an object of this invention to provide a flotation cell that has no moving parts reducing thereby initial cost and maintenance.

It is a further object of this invention to provide such a device which will effectively separate immiscible liquid (such as oil), or suspended solids from water under the influence of air or gas diffused into the cell.

Still a further object of this invention is to provide such a device having a novel means for controlling the separating operation.

Still a further object of this invention is to provide a novel system for injecting air or gas into the cell.

Other objects and advantages will be readily apparent from the following description.

In the drawings:

FIGURE 1 is a side elevation in section of a flotation cell embodying this invention.

FIGURE 2 is a view taken along line 2—2 of FIGURE 1.

In my prior Patent No. 2,746,605 entitled, Treatment of Liquids by Means of Dissolved Gases, issued May 22, 1956, I described generally the process of flotation separation whereby a mixture of immiscible liquids, for example, are directed into a flotation cell with air or other gas dissolved and entrained therein. The gas then escapes solution and carries to the surface therewith the liquid to be separated which is then removed. This present separator utilizes generally the same approach. For the sake of convenience, the liquid or material to be separated from the carrier liquid will be characterized herein and in the claims as "a suspension of material." It should be understood that this term is meant to cover any material, whether liquid or solid, that is to be separated in the manner described herein.

A flotation cell 10 has the mixture to be separated introduced therein through pipe 12 either under the influence of gravity or otherwise. This particular device is adapted to separating oil from water as same are pumped from an oil well; however, the structure obviously has many other similar applications. At the extremity of pipe 12 is provided a box 14 having outlets 16 into the cell.

Positioned beneath box 14 is an intake hood 18 for line 20 which passes through the wall of cell 10 and bends upwardly communicating with weir cell 22. Inside cell 22 is a fixed weir 24 and an adjustable weir 26 mounted upon handle 28 rotation of which adjusts the height of weir 26. An outlet 30 on the opposite side of weir 24 is provided in cell 22. Thus in effect, a U-tube is formed with the inside of cell 10 representing one leg and the line 20 outside of the cell 10 and weir cell 22 forming the other leg. Inside cell 10 an oil skimmer 32 is provided above box 14 and serves as an outlet for the suspension of material being removed. The skimmer is a funnel having an outlet pipe 34 piercing cell 10 and serrated edges 36 inside the cell. If desired, a plurality of suction sludge cleaners may be provided for removing sludge which may accumulate at the bottom of the flotation cell. Such cleaners are shown in the lower left-hand corner and lower right-hand corner of the cell 10 and are identified by numeral 60.

When the cell is filled with pure water the level in the U-tube will be the same in each leg thereof the fluid in each leg having the same specific gravity.

In use the leg of the U-tube represented by pipe 20 and weir cell 22 contains only water by virtue of the hood 18 being positioned beneath and shielding pipe 20 from the fluid to be separated. However, in the other leg of the U-tube, that is the upper portion of cell 10, the mixture of fluid to be separated and air or gas are introduced which have a lower specific gravity. This causes the level within cell 10 to tend to rise and the oil rises to the top of the water over the serrated edge 32 and is drained off through pipe 34 to a suitable storage tank. It is apparent that as large amounts of immiscible liquids and/or suspended solids accumulate, the imbalance is greater and the skimming is increased adjusting the structure to varying supply of material to be treated.

The level of water in weir cell 22 is controlled by adjustment of weir 26 with excess water discharging out outlet 30. Thus the oil which is then added may be separated from the water without any moving parts.

To introduce air or other gas, a pipe 38 enters pipe 20 and leads to a pump 40 wherefrom clear water is pumped under for example 60 p.s.i. pressure to an eductor 42 which draws air or gas from a suitable source through a meter 42 and mixed with the clear water and exhausted at 30 p.s.i. to pipe 44 leading into box 14 and hence out diffusors 46 which are one-way spring-loaded check valves. In addition control valves 48, 50 and 52 are provided to control flow to and from pump 40 and eductor 42. Thus the clear water having air dissolved and entrained therein is discharged into box 14 along with the mixture of oil and water in pipe 12. The air is released in chamber or box 14 (the solubility of a gas in a liquid being directly proportional to pressure and temperature) and mixes with the liquid suspension and adheres to and carries with it to the surface inside cell 10 the oil to be skimmed off. The pump 40 is operated at a rate equal to 20% of the total input volume through pipe 12 which it has been found prevents sinking of oil and also sufficient to support already floated oil if flow through line 12 should be terminated.

While what hereinbefore has been described as the preferred embodiment of this invention, it is readily apparent that modifications and alterations can be made without departing from the scope of the invention, and it is intended to cover herein all such changes and alterations as come within the true scope and spirit of the annexed claims.

I claim:

A flotation apparatus comprising: a tank having an outlet adjacent the top thereof; means defining a closed chamber in said tank, inwardly from all the sides thereof, below the level of said outlet and above the bottom of said tank; inlet conduit means extending into said chamber from the exterior of said tank for introducing liquid and suspended material into said chamber; a plurality of openings through the sides of said chamber for the passage of liquid and suspended material into said tank; a control conduit communicating with the interior of said tank at a level below said chamber and extending upwardly therefrom; weir means in said conduit for controlling the head of liquid in said control conduit; means for dissolving gas in liquid and introducing said gas in liquid, under pressure, into said chamber and releasing the same therein; a hood in said tank, above the bottom thereof and below said chamber, said control conduit communicating with the interior of said tank below said hood.

References Cited by the Examiner

UNITED STATES PATENTS

| | | | |
|---|---|---|---|
| 2,355,564 | 8/1944 | Sebald | 210—197 X |
| 2,675,350 | 4/1954 | Robinson | 210—196 |
| 2,920,763 | 1/1960 | Lind et al. | 210—221 |
| 3,017,998 | 1/1962 | Conley | 210—519 |
| 3,087,710 | 4/1963 | Dujardin | 210—525 X |
| 3,121,680 | 2/1964 | Ciabattari | 210—221 X |

REUBEN FRIEDMAN, *Primary Examiner.*

HARRY B. THORNTON, CHARLES SUKALO,

*Examiners.*